United States Patent
Boehm et al.

(10) Patent No.: US 10,646,306 B2
(45) Date of Patent: May 12, 2020

(54) CAPSULE FOR MIXING AND DISPENSING A DENTAL MATERIAL

(71) Applicant: 3M INNOVATIVE PROPERTIES COMPANY, St. Paul, MN (US)

(72) Inventors: Andreas J. Boehm, Reichling (DE); Marc Peuker, Schoendorf (DE); Peter Braun, Penzing (DE); Dieter Poschmann, Stamberg (DE); Juergen Hella, Andechs (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 33 days.

(21) Appl. No.: 15/303,612

(22) PCT Filed: Apr. 6, 2015

(86) PCT No.: PCT/US2015/024465
§ 371 (c)(1),
(2) Date: Oct. 12, 2016

(87) PCT Pub. No.: WO2015/160552
PCT Pub. Date: Oct. 22, 2015

(65) Prior Publication Data
US 2017/0042640 A1    Feb. 16, 2017

(30) Foreign Application Priority Data

Apr. 16, 2014    (EP) .................................... 14164985

(51) Int. Cl.
*A61C 5/68* (2017.01)
*A61C 5/64* (2017.01)
*A61C 5/66* (2017.01)

(52) U.S. Cl.
CPC .................. *A61C 5/68* (2017.02); *A61C 5/64* (2017.02); *A61C 5/66* (2017.02)

(58) Field of Classification Search
CPC ..... A61C 5/60; A61C 19/005; A61C 5/64–68; A61J 1/06–067; A61J 1/2093;
(Continued)

(56) References Cited

U.S. PATENT DOCUMENTS 3,731,853 A * 5/1973 Baumann .............. A61M 3/005
206/219
3,739,947 A * 6/1973 Baumann .............. A61M 5/284
206/219
(Continued)

FOREIGN PATENT DOCUMENTS

CA    2699127    10/2010
DE    3920537    2/1990
(Continued)

OTHER PUBLICATIONS

International Search Report for PCT International Application No. PCT/US2015/024465, dated May 22, 2015, 4 pages.

*Primary Examiner* — Edward Moran
*Assistant Examiner* — Matthew P Saunders (57) ABSTRACT

A capsule for mixing and dispensing a dental material which has a capsule body and a cavity extending into the capsule body. The cavity is closed by a liquid container. The liquid container has a cartridge forming a channel that extends between a front opening and a rear opening of the cartridge. Further the cartridge has a front foil closing the front opening and a rear foil closing the rear opening. The front foil is attached at the cartridge along a closed path circumferentially around the front opening. The front foil and the cartridge in at least a partial area of the circumferential path are separably sealed with each other, thus defining an openable valve through that path. The capsule has further a piston received in the channel of the cartridge and arranged such that the liquid is enclosed in the cartridge between the
(Continued)

front foil and the piston. The capsule facilitates the preparation of a two-component dental material.

16 Claims, 3 Drawing Sheets

(58) Field of Classification Search
CPC .... A61J 1/2096; A61J 11/009; A61J 11/0095; A61M 5/28; A61M 5/281; A61M 5/284; A61M 5/285; A61M 5/286; A61M 5/288; A61M 5/30; A61M 2005/287
USPC .......... 433/81, 102, 226–228.1, 90; 222/386–391; 604/82–92, 191; 401/171–182
See application file for complete search history.

(56) References Cited

U.S. PATENT DOCUMENTS

| | | | |
|---|---|---|---|
| 3,860,114 A | 1/1975 | Merckardt | |
| 4,941,751 A | 7/1990 | Muhlbauer | |
| 5,088,830 A * | 2/1992 | Muhlbauer | B01F 11/0017 366/108 |
| 6,386,872 B1 * | 5/2002 | Mukasa | A61C 5/64 206/219 |
| 8,893,925 B2 | 11/2014 | Cheetham | |
| 8,968,000 B2 | 3/2015 | Leiner | |
| 2003/0176834 A1 * | 9/2003 | Horth | B65D 81/3222 604/85 |
| 2005/0252795 A1 * | 11/2005 | Peuker | B65D 81/3255 206/222 |
| 2007/0272567 A1 * | 11/2007 | Peuker | A61C 5/064 206/219 |
| 2010/0240004 A1 * | 9/2010 | Zalsman | A61C 5/62 433/90 |
| 2010/0264439 A1 * | 10/2010 | Chen | H01L 33/483 257/98 |
| 2011/0056853 A1 * | 3/2011 | Cheetham | A61C 5/64 206/219 |
| 2011/0056984 A1 | 3/2011 | Cheetham | |
| 2012/0258422 A1 * | 10/2012 | Leiner | B65D 81/3255 433/90 |
| 2017/0209237 A1 * | 7/2017 | Peuker | A61C 5/64 |

FOREIGN PATENT DOCUMENTS

| | | |
|---|---|---|
| EP | 1159931 | 12/2001 |
| EP | 2510897 | 10/2012 |
| JP | H08-131459 | 5/1996 |
| WO | WO 2000-023002 | 4/2000 |

* cited by examiner

CAPSULE FOR MIXING AND DISPENSING A DENTAL MATERIAL

FIELD OF THE INVENTION

The invention relates to a capsule for mixing and dispensing a dental material. In particular the invention relates to a capsule for mixing a powder and a liquid which are separately stored and which can be brought together for mixing in a shaker by activating the capsule.

BACKGROUND ART

Dental substances are often provided in devices allowing the substance to be dispensed directly to a desired location, for example on a dental pad or in a patient's mouth. Such dispensing devices typically have a chamber for holding the dental substance, an outlet, and a piston for extruding the substance from the chamber through the outlet.

A variety of dispensing devices are designed for dispensation of relatively high viscosity dental substances, like for example dental filling materials. Some of those dispensing devices are configured for use with an applicator providing an extrusion force that is sufficient for dispensation of high viscosity dental substances. In dentistry several types of manually operated applicators are available which provide leverage for increasing manual forces to provide sufficient extrusion forces. Many applicators are designed as a reusable tool which forms part of a dental practice's basic equipment.

A particular dispensing device often used to store, prepare and dispense a hardenable dental material mixed from a powder and a liquid is the so-called dental capsule in which the mixing of the powder and the liquid is performed within the capsule by shaking the capsule in a shaker.

U.S. Pat. No. 8,893,925 discloses container for mixing and dispensing material. The container comprises a body having a main chamber, a dispensing nozzle, a liquid receptacle and a plunger. The liquid receptacle has a front portion arranged to break away upon pressure being applied by the plunger so that the plunger can traverse the entire length of the body. This enables a charge of material in the main chamber to be entirely dispensed through a frangible wall into the nozzle. The container is particularly envisaged for use in mixing and dispensing of dental materials.

U.S. Pat. No. 8,968,000 discloses a mixing and application capsule for producing and discharging a dental preparation. To prevent a liquid loss, a mixing and application capsule for producing a dental preparation is proposed. The capsule has a capsule body with a mixing chamber for receiving a mixing component and for mixing the dental preparation from the mixing component and a fluid. The capsule further has an outlet opening for discharging the dental preparation. A first plunger body which can be displaced in the capsule body delimits the mixing chamber in the capsule body. The first plunger body has a channel to guide the fluid from a cavity into the mixing chamber and a projection. The capsule has further a second plunger body which can be displaced in the capsule body relative to the first plunger body. The second plunger body has the cavity to receive the fluid. The cavity is configured to receive the projection of the first plunger body.

Such capsules have a variety of advantages as, for example, a relatively long shelf life. However there is a still desire for a capsule with such a long shelf life, which is easy to use and which is nevertheless relatively inexpensive.

SUMMARY OF THE INVENTION

The invention relates to a capsule for mixing and dispensing a dental material. The capsule comprises:
a capsule body having a front end and a rear end, and
a cavity extending from the rear end into the capsule body. The cavity merges adjacent the front end in an outlet through the capsule body. Further the cavity is closed adjacent the rear end of the capsule body by a liquid container.

The liquid container comprises a cartridge forming a channel therethrough. The channel extends between a front opening and a rear opening of the cartridge. In other words the channel preferably forms the front opening and the rear opening within the cartridge and is otherwise closed. Further the liquid container further has a front foil closing the front opening and a rear foil closing the rear opening. The front foil is attached at the cartridge along a closed path circumferentially around the front opening. The front foil and the cartridge in at least a partial area of the circumferential path are separably sealed with each other. The cartridge and the front foil thus define an openable valve through that circumferential path. The valve therefore may assume a closed position and an open position. In the closed position front foil is attached at the cartridge along a closed path circumferentially around the front opening. And the open position the valve preferably provides for an interruption of the circumferential attachment and a passageway extending across that circumferential path and between the front opening and an exterior of the cartridge.

The capsule further comprises a piston received in the channel of the cartridge, particularly between the front and rear opening of the cartridge. The piston is further arranged such that the liquid is enclosed in the cartridge between the front foil and the piston. Thus the piston is preferably arranged for pressurizing the liquid toward the front opening. The piston is further preferably sealingly and movably fitting within the channel of the cartridge.

The invention is advantageous in that it provides a liquid container for storing a liquid in a tightly sealed configuration. Further the invention provides a capsule which can be activated for use relatively easily. In particular, although the capsule of the invention allows for tightly sealing a liquid, the seal can be opened for activation of the capsule by applying only relatively low forces to the capsule. In contrast to some prior art capsules which require high forces and therefore a separate tool for activation, the present invention provides a capsule that normally can be activated manually. Further the capsule of the invention allows for storing an amount of liquid which can be selected from a relatively wide range of different amounts, from very low amounts to relatively high amounts, without substantially modifying the configuration of the capsule. Further the capsule of the present invention provides a relatively precise mixing ratio of the dental material because the capsule allows for controlling the amount of liquid used for preparing the dental material relatively precisely. Additionally the capsule of the invention is relatively easy to use and relatively inexpensive in manufacturing.

The capsule body is preferably substantially cup-shaped with a front wall through which the outlet extends and a circumferential side wall extending rearwards to the rear end of the capsule body. The side wall may extend along a longitudinal axis of the capsule, and may be shaped essentially rotationally symmetric, for example circular, although other shapes (for example elliptical) is possible. The side wall and the front wall, in combination, preferably form the cavity. The cavity may extend along the longitudinal axis at a circular cross-section, although that circular cross-section may vary in diameter. The smallest cross-section of the outlet is preferably smaller than the smallest cross-section of the cavity. In one embodiment the diameter of the smallest cross-section of the outlet may be between 0.5 mm and 3 mm, and the smallest cross-section of the cavity may be between 5 mm and 9 mm.

The valve formed by the front foil and the cartridge is preferably irreversible. This means that the valve is preferably initially closed, can optionally be opened, but cannot be reclosed again. Thus the capsule is provided with a tamper-evident closure.

In one embodiment the capsule further comprises a plunger. The plunger may have a plug which cross-section is sized and shaped substantially corresponding to the size and shape of the rear opening of the cartridge. The plug may form a cutting edge for punching the rear foil of the liquid container. Thus by urging the plunger along the longitudinal axis toward the liquid container the rear foil can be punched through by the plug so that the plug is enabled to penetrate into the channel of the cartridge.

In a further embodiment the plunger has a guiding structure providing the plunger with an outer cross-section that is larger than the cross-section of the plug. Therefore the plunger may be guided for a movement along the longitudinal axis by the capsule body within the cavity. The guiding section is preferably sized and shaped to fit within the cavity in a guided fashion with the capsule body. For example the guiding section may be ring-shaped having an outer diameter which generally corresponds to the inner diameter of the cavity adjacent the rear end of the capsule body.

In one embodiment the plunger has a predetermined breaking point for separably connecting the guiding structure and the plug with each other. For example the guiding structure and the plug may form one monolithic piece and a weakened portion between them may provide the predetermined breaking point. In this regard the term "point" generally refers to an area or line which is prepared to break upon exposure to a threshold force.

In an embodiment the plug—separated from the guiding structure—and the cartridge each are sized and shaped to in combination complement to an outwardly substantial cylindrical stamp. Therefore the plug in combination with the cartridge may be used to dispense the dental material from the capsule.

In one embodiment the cartridge is shaped such that the channel has a stepped configuration. In particular the channel may have a rear section and a front section. The transition between the rear and front section preferably forms the step of the stepped configuration. The rear section preferably forms the rear opening and further preferably extends at a generally uniform cross-section, for example circular. Thus the piston may be movably received within the rear section, and may be movable along the dimension along which the rear section extends. Further the front section preferably forms the front opening. The front section is preferably narrower than the rear section at least at the front opening. The front section may be conical and may narrow from the step in the channel toward the front outlet. The largest diameter of the front section is preferably still smaller than the diameter of the rear section. The largest diameter of the front section may for example be smaller by about 1.5 mm than the diameter of the rear section. Preferred diameters of the smallest diameter of the front section are between 3 mm and 10 mm, preferred diameters of the greatest diameter of the front section are between 3.5 mm and 10.5 mm, and preferred diameters of the diameter of the rear section are between 5 mm and 12 mm.

In one embodiment the piston is positioned in the liquid container such that a space is formed between the piston and the rear foil. In particular the piston may be positioned within the rear section of the channel of the cartridge enclosing the liquid between the front foil and the piston and enclosing air between the rear foil and the piston. Thus the liquid container combines the liquid and the air in one sealed area and the piston separates the liquid and the air. Therefore while the liquid and air are prevented from escaping from the liquid container very small portions of the air are enabled to permeate and/or diffuse toward the liquid. This is because the piston, although it may form a generally tight seal with the cartridge for the liquid, may still allow diffusion of air molecules through contact areas between the piston and the cartridge or permeation of atoms or molecules through the piston. In particular oxygen molecules may diffuse or permeate into the liquid and thus may prevent anaerobic polymerization of the liquid. Further due to the separation of the liquid and the air the liquid is kept generally free of air bubbles. Air bubbles may lead to inaccurate amounts of liquid in the preparation of the dental material. Therefore the capsule of the invention provides for a relatively reliable mixing ratio for preparing the dental material.

In one embodiment cartridge has at least one stopper for limiting a travel of the piston. The stopper is preferably arranged such that the piston is prevented from getting in contact with the step formed in the channel of the cartridge. Thus a pre-determined, though preferably small, amount of liquid is ensured to reside within the liquid container upon activation of the capsule. It has been found that particularly the last small amount of liquid can be extruded from the container at relatively high tolerances of that amount. Accordingly the capsule is adapted to capture such amount within the liquid container. Therefore a relatively reliable and precise amount of liquid can be transferred from the liquid container to the mixing chamber upon activation of the capsule.

In one embodiment the capsule body forms a resistance within the cavity, which impedes a movement of the cartridge or liquid container within the cavity toward the outlet. Thus the cartridge/liquid container is retained within the capsule body against movement toward the outlet, for example during the plunger is urged toward the liquid container for activation of the capsule. The resistance is preferably formed by a step in the cavity. In particular the step may be formed by a transition of a front section of the cavity extending along a generally uniform cross-section toward the outlet and a rear section of the cavity extending along a larger generally uniform cross-section toward the capsule body rear end.

In one embodiment the liquid container and thus the cartridge is received within the cavity, in particular at least partially within the front section. The cartridge is preferably sized and shaped to form a seal with the capsule body, in particular with the side wall of the capsule body in an area of the front section. Therefore the liquid container can be used to seal the front section of the cavity and enclose a powder component therein. Preferably the liquid container is positioned within the cavity such that the powder only partially fills the chamber formed between the liquid container and the capsule body. The chamber further forms a mixing chamber in which the powder may be mixed with the liquid transferred from the liquid container into the mixing chamber.

In an embodiment the capsule further has a nozzle for dispensing the dental material. The nozzle may be movable (for example pivotable) between a dispensing position and a storage position. In the dispensing position the nozzle is in fluid communication with the outlet and in the storage position the nozzle closes the outlet. The dispensing position may comprise several geometric positions between the nozzle and the body, or a range between two geometric extreme positions. For example the dispensing position of a nozzle that is pivotable with respect to the body may within the dispensing position be pivotable over an angular range whereas the storage position is outside that angular range.

In one embodiment the capsule comprises a powder within the cavity. The powder and the liquid are preferably adapted to form, in combination, a hardenable dental material. The powder may be a glass powder or resin modified glass powder. The liquid may be a water based polyacid or a monomer based polyacid with light initiator.

In one embodiment the capsule body comprises a catch for retaining the capsule in a dispensing gun. The catch may be formed as a circumferential bulge arranged adjacent the rear end of the capsule body and protruding radially outwardly therefrom.

In a further embodiment the front and rear foil each comprise a, preferably contiguous, metal layer and at least one polymer layer. Each the front and rear foil being arranged with the polymer layer toward the cartridge. The front and/or rear foil may have further layers, particularly polymeric layers. For example the front and/or rear foil may have two outer polymeric layers with the metal layer arranged between. A preferred configuration of the front and/or rear foil comprises a layer construction made up of PE (polyethylene), aluminum and PE in the order as listed.

In one embodiment the capsule body, the nozzle, the cartridge and the piston each are made of a plastic material. For example the capsule body may be made of POM (polyoxymethylene) or PP, the nozzle may be made of PC (polycarbonate), and the cartridge and the piston may be made of PE or PP (polypropylene). The cartridge may comprise side walls made from two or more layers, for example a first layer providing a good barrier against permeation and/or diffusion of substances (for example oxygen, water or other solvents) and a second layer providing good mechanical strength. Such a multilayer wall may be obtained by two- or multi-component injection molding of the cartridge. Suitable polymers for a suitable layer combination may comprise LCP (liquid crystal polymer) and HDPE (high density polyethylene).

DETAILED DESCRIPTION OF THE INVENTION

Figure 1:
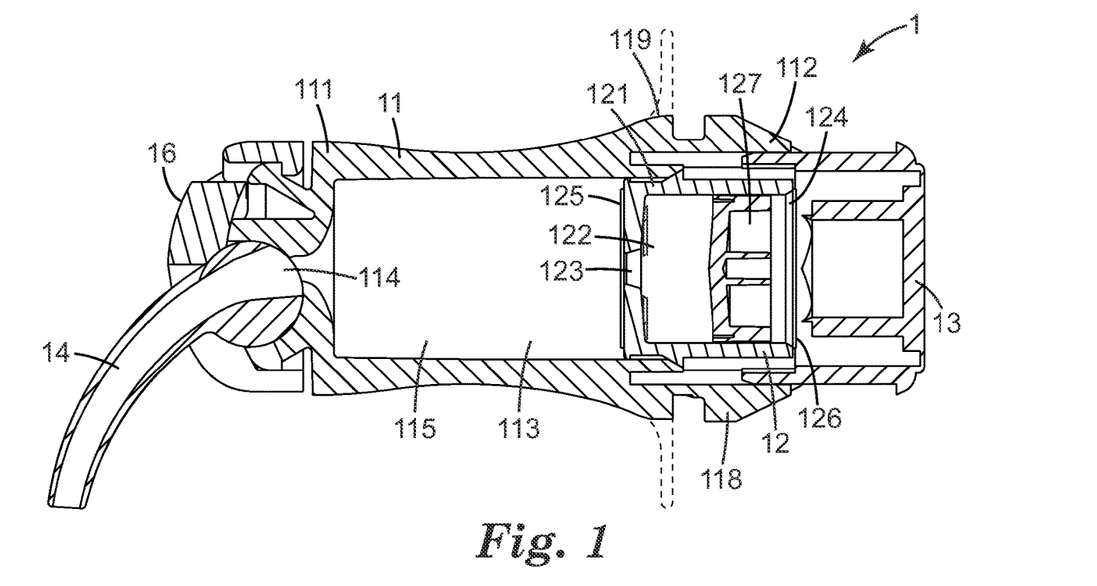
FIG. 1 is a cross-sectional view of a capsule according to an embodiment of the invention.

FIG. 1 shows a capsule 1 for mixing and dispensing a dental material. The capsule 1 has a capsule body 11 that has a front end 111 and a rear end 112. A cavity 113 extends from the rear end 112 into the capsule body 11. The cavity 113 merges adjacent the front end 111 of the capsule body 11 in an outlet 114 through the capsule body 11. The cavity 113 is closed by a liquid container 12. The liquid container 12 is positioned adjacent the rear end 112 of the capsule body 11 and spaced from the outlet 114. The space formed in the cavity 113 between the outlet 114, the capsule body 11 and the liquid container 12 forms a mixing chamber for mixing the dental material. At an initial stage as shown the mixing chamber is preferably (partially) filled with a powder material and the liquid container 12 is preferably filled with a liquid. The capsule 1 is adapted to be activated by a user. Such an activation of the capsule 1 causes the liquid to be transferred into the mixing chamber, as further described in detail in the following. The liquid and then powder thus are received within the mixing chamber. At the activated stage the capsule 1 can be placed in an agitator (not shown) in which the capsule may be shaken to cause the powder and the liquid to mix with one another. The powder and the liquid are preferably adapted to form a hardenable composition in combination. An exemplary powder material comprises a glass powder or resin modified glass powder and an exemplary liquid comprises a water based polyacid or a monomer based polyacid with light initiator, and the mixture thereof comprises a glass-ionomer dental material. The mixture from the powder and the liquid typically forms a pasty material which can be dispensed through the outlet 114 of the capsule body as further described in the following. For dispensing the dental material the capsule 1 further comprises a nozzle 14 which is attached adjacent the front end 111 of the capsule body 11. The nozzle 14 and the capsule body 11 are pivotable between a dispensing position (shown) and a storage position. In the dispensing position the nozzle 14 opens the outlet 114 of the capsule 1 for dispensing the dental material, whereas in the storage position the nozzle 14 closes the outlet 114. In the example the nozzle 14 is retained at the capsule body 11 by a cap 16. In another example the nozzle 14 and the capsule body 11 may however be molded into each other, for example by first molding the nozzle 14 and subsequently overmolding the nozzle 14 by the capsule body 11. Further the capsule 1 has a catch 118 for retaining the capsule 1 in a dispensing gun (not shown). Such a dispensing gun is for example commercially available under the designation 3M™ ESPE™ Capsule Dispenser form the company 3M Deutschland GmbH, Germany. The catch 118 in the example is formed by a circumferential bulge at the rear end 112 of the capsule body 11. A circumferential rim 119 is arranged spaced from the catch 118 further to the front end 111 of the capsule body. As indicated by the dashed line the rim 119 may form a finger plate. The finger plate can assist in retaining the capsule manually while activating the capsule 1 for bringing the powder and 113 the liquid in contact with each other.

Figure 2:
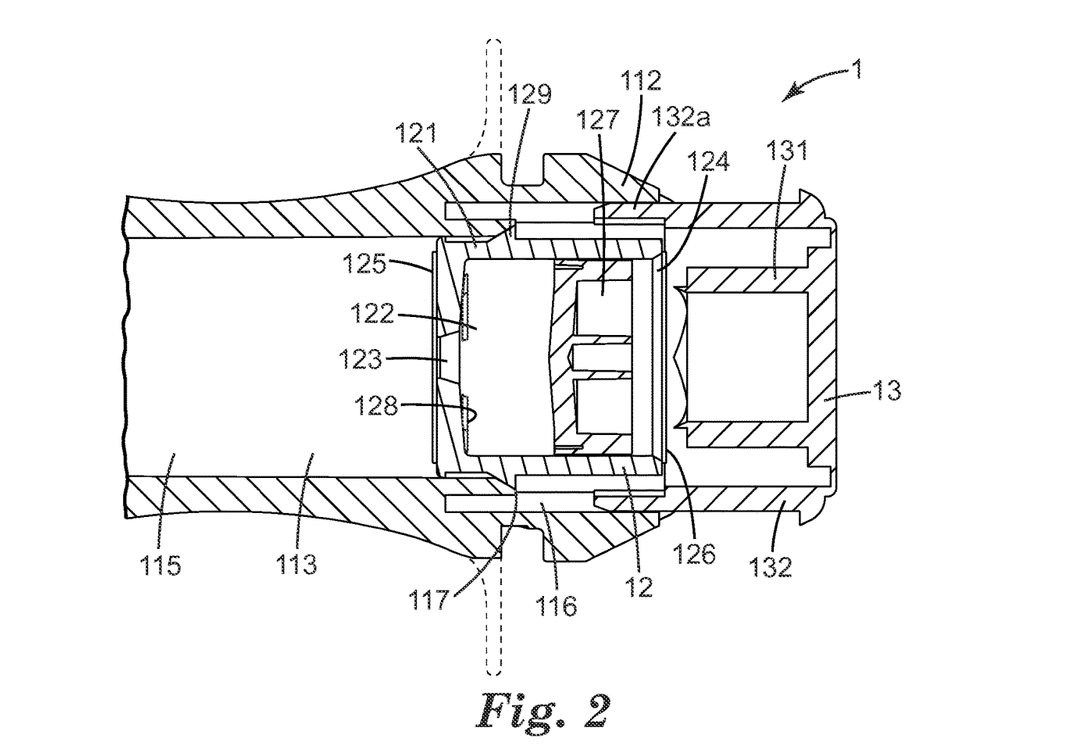
FIG. 2 is an enlarged cross-sectional view of the capsule shown in FIG. 1.

FIG. 2 is an enlarged view of a portion of the capsule 1, showing the liquid container in more detail. The liquid container 12 comprises a cartridge 121. The cartridge 121 in the example is generally ring-shaped and forms a channel 122 therethrough. The channel 122 extends between a front opening 123 and a rear opening 124 of the cartridge 121. The cartridge 121 is preferably made of a plastic material, in particular may be made of a thermoplastic material, for example polyethyelene or polypropylene. The liquid container 12 further has a front foil 125 that closes the front opening 123 and a rear foil 126 that closes the rear opening 124. The front foil 125 and the rear foil 126 each comprise a contiguous layer of metal, preferably an aluminum layer. In one example the aluminum layer has a thickness of between 0.008 mm and 0.1 mm, preferably about 0.03 mm. The metal layer is preferably generally adapted to block substances, in particular air and moisture from permeating through the front and/or rear foil 125, 126. Preferably each of the front and the rear foil 125, 126 further comprise a polymeric layer, preferably a layer comprising or consisting of polyethylene. This allows for the front and the rear foil 125, 126 to be heat sealed with the polymeric layer to the thermoplastic cartridge. Heat sealing may be performed using a heated tool or by ultrasonic welding, for example. Further the thermoplastic layer forms a protective layer for the metal layer so as to avoid undesired chemical or physical interaction between the liquid and the metal layer.

The front foil 125 is attached at the cartridge 121 along a closed path circumferentially around the front opening 123, and the rear foil 126 is attached at the cartridge 121 along a closed path circumferentially around the rear opening 124. Thus the channel 122 is tightly sealed so that the front foil 125, the rear foil 126 and the cartridge 121 in combination form a closed liquid chamber. In the example the liquid chamber contains a liquid forming one component of the dental material, as described.

The front foil 125 and the cartridge 121 in at least a partial area of the circumferential path are separably sealed with each other. In the example the front foil 125 and the cartridge 121 are overall separably sealed with each other. Such a separable seal can be provided by heat sealing the front foil 125 with its polymeric layer oriented to the cartridge 121 for a predetermined time, at a predetermined temperature and a predetermined sealing pressure.

Thus the separably sealed area defines an openable valve through the circumferential path. In particular if the liquid is pressurized toward the sealed front opening 123 at a certain predetermined minimum or threshold pressure the interconnection between the front foil 125 and the cartridge starts yielding and thus enables the liquid to creep between the front foil 125 and the cartridge 121. It has been found that the front foil 125 does not entirely separate from the cartridge 121. In contrast the liquid reproducibly creates only a passageway continuing from the front opening 123 toward an outer boundary of the front foil 125. Therefore the front foil 125 remains attached at the cartridge although a portion of the front foil 125 separates by liquid pressure.

To build up a pressure on the liquid a piston 127 is received in the channel 122 of the cartridge 121. The piston 127 is arranged between the front and rear opening 123, 124 of the cartridge 121. Therefore the piston 127 is sealed within the liquid chamber together with the liquid. In particular the piston 127 is sealingly received within the channel 122, for example by a press fit, and is movable along the channel. The piston 127 is arranged in the cartridge 121 such that the liquid is enclosed in the cartridge 121 between the front foil 125 and the piston 127. The piston 127 may be moved toward the front opening 123 for pressurizing the liquid toward the front opening, thus causing the valve to open and for transferring the liquid into the mixing chamber. This is further explained in detail below. In the example further the piston 127 is arranged in the cartridge 121 such that a space is formed between the rear foil 126 and the piston 127. The space may be filled with air. Any air sealed within the liquid chamber may be used to avoid anaerobic polymerization of the liquid. On the other hand the air and the liquid are separated by the piston so that any liquid transferred in the mixing chamber substantially does not contain air or air bubbles. Therefore a reliable predetermined amount of liquid may be transferrable to the mixing chamber by movement of the piston 127 for a predetermined stroke. Further it has been found that in attempts to entirely empty the liquid chamber by moving the piston 127 in an end position adjacent the front opening 123 results in tolerances of the amount of liquid transferred. This is because as the piston 127 approaches the end position, the space between the piston 127 and the inside of the cartridge 121 gets smaller and the smaller the space the more is the liquid hindered in being displaced toward the front opening 123. Thus, depending on the viscosity of the liquid and any force at which the piston 127 is moved, a non foreseeable residual amount of liquid may be captured in that space. The cartridge 121 of the invention therefore has at least one stopper 128 which stops the piston 127 at a position prior to the end position. In other words the piston 127 and the cartridge 121 are shaped such that in the closest position of the piston 127 relative to the front opening 123 still sufficient space for easy displacement of the liquid is available between the piston 127 and the cartridge 121. Therefore the tolerances in the amount transferred to the mixing chamber can be minimized.

The cavity 113 has a stepped configuration provided by a front section 115 and a wider rear section 116. Preferably the cavity 113 extends into the capsule body 11 at a generally circular cross-section. Further the front section 115 and the rear section 116 extend substantially concentrically and each at a generally uniform circular cross-section. Thus the transition between the front and rear section 115, 116 forms a step 117 in the cavity 113. The step 117 in forms a resistance for impeding a movement of the cartridge 121 within the front section 115 of the cavity 113. Therefore the cartridge 121 further has a detent 129, in the example a circumferential ridge or bulge, for cooperating with the resistance. In particular the detent provides the cartridge with a cross-section that is larger than the inner cross-section of the front section 115 of the cavity 113. Thus the cartridge 121 and the capsule body 11 are adapted such that the cartridge 121 can be only press fit within the front section 115 of the cavity 113.

The capsule 1 further has a plunger 13. The plunger 13 has a plug 131 which is receivable within the cartridge 121 through the rear opening 124, for pushing the piston 127 toward the front opening 123. The plug 131 has a cross-section that is sized and shaped substantially corresponding to the size and shape of the rear opening 124 of the cartridge 121. In the example the plug 131 and the rear opening 124 have a generally circular cross-section. Further the plug 131 may form a cutting edge (not shown in this view) for punching through the rear foil 126 of the cartridge 121. The plunger 13 further has a guiding structure 132. The guiding structure 132 enables the plunger to be guided within the cavity 113 of the capsule 1. The guiding structure 132 provides the plunger 13 with an outer cross-section that is larger than the cross-section of the plug. Further the guiding structure is sized and shaped to fit within the rear section 116 of the cavity 113 of the capsule body 11 in a guided fashion. Therefore the plunger 13 can pushed toward the cartridge 121, and because the cartridge 121 is retained within the capsule body 11, thereby with the plug 131 can penetrate through the rear foil 126 for moving the piston 127 toward the front opening 123. The guiding structure 132 may have extensions 132a. The extensions protrude rod-shaped from a front end 134 of the plunger 13. The capsule body 11 further has corresponding recesses for receiving or absorbing the extensions 132a therein. The extensions 132a allow for the plunger 13 to be positioned substantially outside the capsule body 11 only held by the extensions 132a within the capsule body 11. Thus the possible stroke of the plunger 13 can be enhanced without increasing the overall length of the capsule 1.

FIGS. 3 to 6 illustrate the activation of the capsule 1 in more detail. For convenience some of the Figures illustrate the cartridge 121 and the plunger 13 only.

Figure 3:
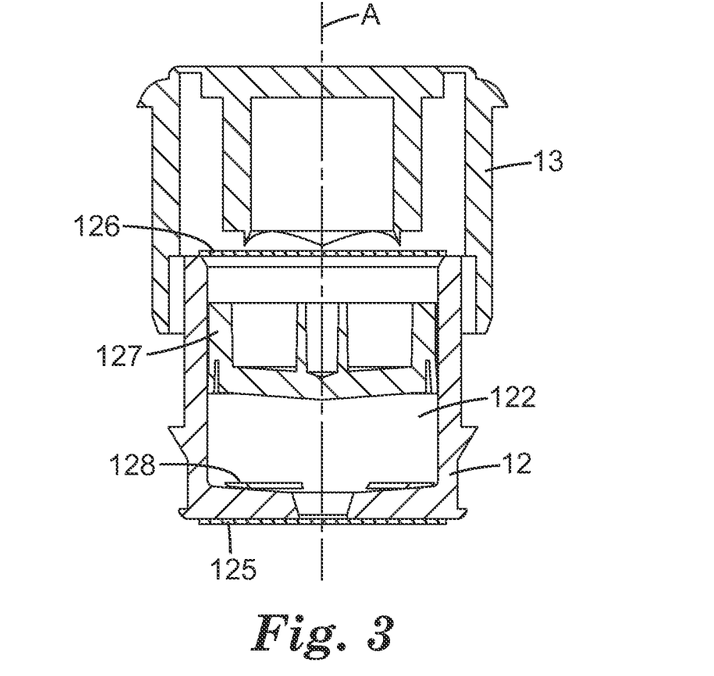
FIG. 3 is a cross-sectional view of a liquid container and a plunger according to an embodiment of the invention at one stage of operation.

FIG. 3 shows the cartridge 121 and the plunger 13 in an initial position. In the initial position the liquid is sealed within the channel 122 by the cartridge 121, and the front and rear foil 125, 126. The plunger 13 and the cartridge 121 are coaxially aligned with each other along longitudinal axis A.

Figure 4:
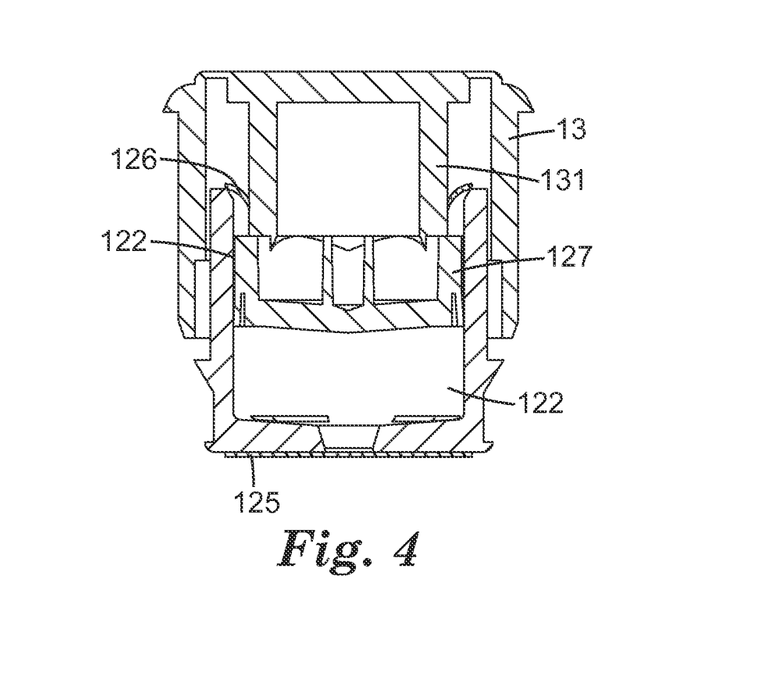
FIG. 4 is a cross-sectional view of a liquid container and a plunger according to an embodiment of the invention at a further stage of operation.

FIG. 4 shows cartridge 121 and the plunger 13 moved further toward each other along the longitudinal axis A. At the stage shown the plug 131 is penetrated in the channel 122 and abuts the piston 127. Although not illustrated the rear foil is punched or ruptured in consequence of the plug 131 having penetrated into the channel 122 of the cartridge.

Figure 5:
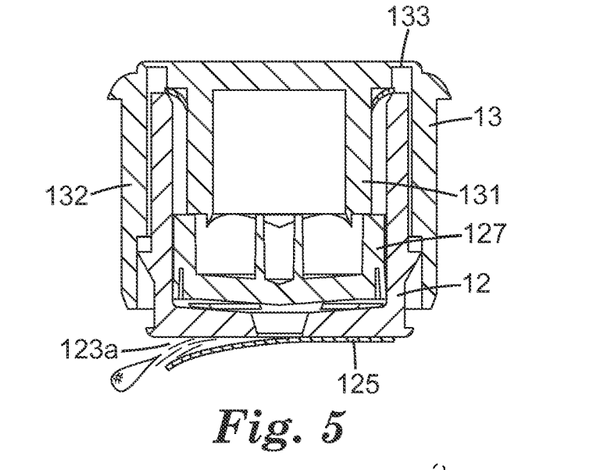
FIG. 5 is a cross-sectional view of a liquid container and a plunger according to an embodiment of the invention at still a further stage of operation.

FIG. 5 shows cartridge 121 and the plunger 13 moved even further toward each other such that the piston 127 is positioned at the closest possible position relative to the front opening 123. At this stage a portion of the front foil 125 is separated from the cartridge 121 and provides a passageway 123a between the front opening 123 and the exterior of the cartridge 121. Further the liquid is extruded from the liquid chamber through the passageway 123a. Although not shown the liquid extruded from the cartridge 121 is received within the cavity of the capsule body. The plunger 13 has a predetermined breaking point or predetermined breaking area 133 which separably connects the guiding structure 132 and the plug 131. The predetermined breaking point/area 133 allows the plug 131 and the guiding structure 132 to be separated for dispensing any dental material mixed within the capsule 1 as further described in the following.

Figure 6:
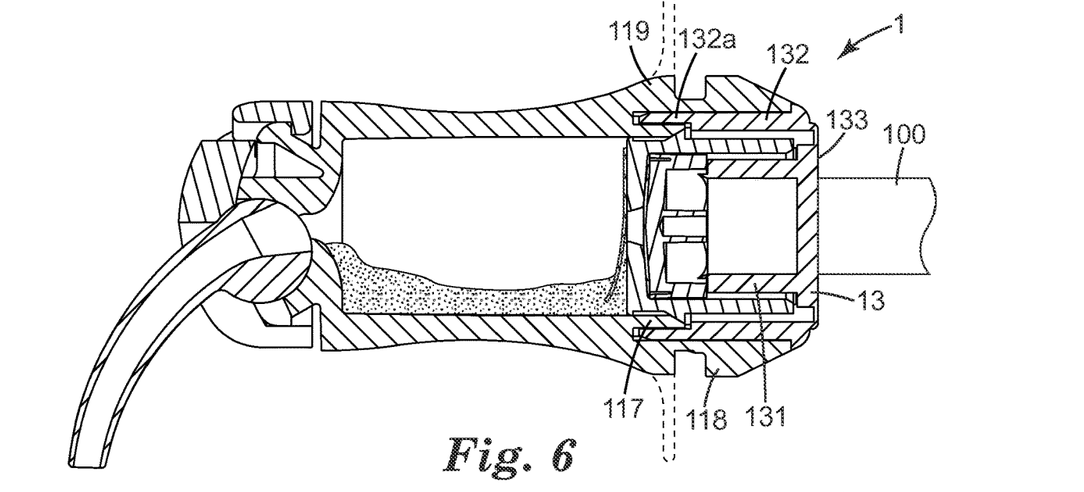
FIG. 6 is a cross-sectional view of the capsule shown in FIG. 1 after activation and prior to dispensation.

FIG. 6 shows the activated capsule 1 after mixing the liquid and the powder. A hardenable dental material 15 is present in the mixing chamber. Further at the stage shown a ram 100 of a dispensing gun (not shown in detail) is positioned within the cavity 113. The predetermined breaking point/area 133 is broken and the guiding structure 132 and the plug 131 are separated from each other. This is because the guiding structure 132 fits into the rear section 116 of the capsule body 11 but not in the front section 115. Thus upon urging the plunger 13 into the capsule body the guiding structure 132 by the step 117 is prevented from moving and by pushing the plunger 13 at the plug 131 a mechanical force is exerted to the predetermined breaking point/area 133 which breaks upon reaching a minimum force in consequence. The plug 131 and the container 12 in combination form an outwardly generally cylindrical stamp which can be used to extrude the dental material 15 from the capsule 1.

In the embodiment in which the rim 119 forms the finger plate the capsule body 11 can be retained at the rim 119 while the plunger 13 is pushed toward the capsule body 11. For example the capsule 1 may be placed with the plunger downwards on a table and the capsule body 11, using the finger plate, may be manually pressed down toward the table to cause the plunger 13 to be pushed into the capsule body 11.

Figure 7:
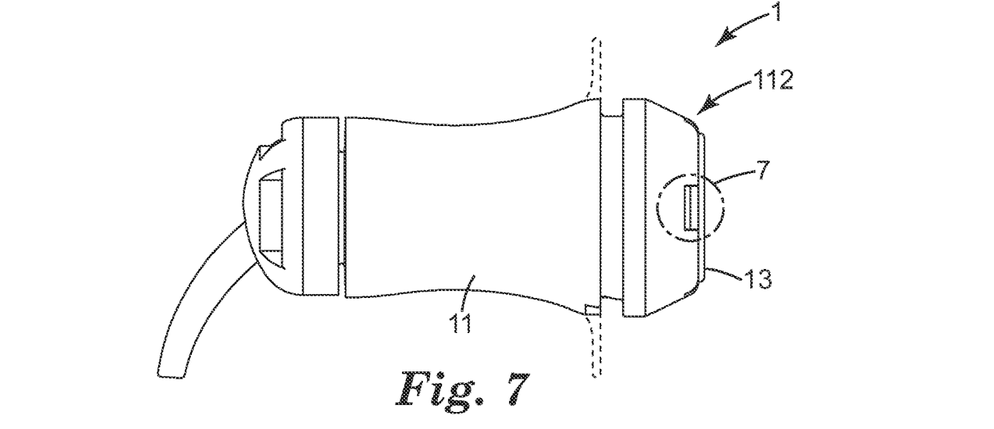
FIG. 7 is a exterior side view of the capsule shown in FIG. 6.

FIG. 7 shows the capsule 1 in an exterior view. The capsule 1 is shown at a stage at which the plunger 13 is positioned at its desired end position within the capsule body 11. In this end position the desired amount of liquid stored in the liquid container (not visible in this view) is normally transferred into the mixing chamber. To indicate a user of the capsule 1 that the plunger 13 is positioned in its end position relative to the capsule body lithe capsule 1 is provided with an activation control 7. The activation control 7 comprises one or more recesses extending into the capsule body 11 from the rear end 112 and protrusions at the plunger 13 which are sized and shaped to substantially exactly fill any structure recessed by the recesses in the capsule body. In the example the shape of the read end 112 of the capsule body 11 and the protrusions 13 complement to a circumferential ring-shaped structure. Therefore any malposition relative to the end position can be easily recognized by the user.

The invention claimed is:

1. A capsule for mixing and dispensing a dental material comprising a powder component and a liquid component, the capsule comprising:
   a capsule body having a front end and a rear end; and
   a cavity extending from the rear end into the capsule body, the cavity having a decreasing cross-section approaching the front end thereby forming an outlet through the capsule body, the cavity adjacent the front end forming a mixing chamber adapted to contain the powder component and the cavity adjacent the rear end being closed by a liquid container,
   wherein the liquid container comprises:
      a cartridge forming a channel therethrough, the channel extending between a front opening and a rear opening of the cartridge and adapted to contain the liquid component;
      a front foil closing the front opening; and
      a rear foil closing the rear opening,
      wherein in a closed position the front foil is attached at an outside of the cartridge along a closed path circumferentially around the front opening, and
      wherein the front foil and the cartridge in at least a partial area of the closed path are separably sealed with each other, thus defining an openable valve through the closed path such that in an open position the openable valve provides a passageway through the partial area of the closed path for at least a portion of the liquid component to flow from the channel of the cartridge into the mixing chamber, the passageway extending between the front opening and an exterior of the cartridge;
      a piston slidably moveable in and sealingly fitting in the channel of the cartridge between the front opening and the rear opening and arranged such that the liquid component is enclosed in the channel of the cartridge between the front foil and the piston,
      wherein the liquid container includes at least one stopper arranged within the cartridge for limiting travel of the piston within the channel; and
      a plunger received within the rear opening of the capsule body and having a plug receivable within the rear opening of the cartridge, the plug having a cutting edge positioned toward the rear foil when the plug is received in an initial position within the rear end of the capsule body, such that when the plunger is moved from the initial position toward the front opening of the cartridge, the cutting edge of the plug punches through the rear foil of the cartridge and moves the piston toward the front opening of the cartridge to pressurize the liquid in the channel of the cartridge, the front foil separates from the at least partial area of the closed path to form the passageway and at least a portion of the liquid is transferred from the channel of the cartridge through the passageway and into the mixing chamber.

2. The capsule of claim 1, wherein the plug has a cross-section that is sized and shaped corresponding to the size and shape of the rear opening of the cartridge.

3. The capsule of claim 2, wherein the plunger has a guiding structure providing the plunger with an outer cross-section that is larger than the cross-section of the plug, and wherein the guiding structure is sized and shaped to fit within the cavity of the capsule body in a guided fashion.

4. The capsule of claim 2, wherein the plunger has a predetermined breaking point for separably connecting the guiding structure and the plug with each other.

5. The capsule of claim 1, wherein the cartridge is shaped such that the channel has a stepped configuration with a rear section of the channel forming the rear opening and extending at a generally uniform cross-section and a front section of the channel forming the front opening and being narrower than the rear section at least at the front opening.

6. The capsule of claim 1, wherein the piston is positioned in the cartridge such that a space is formed between the piston and the rear foil.

7. The capsule of claim 1, wherein the capsule body forms a resistance within the cavity, which impedes a movement of the cartridge within the cavity toward the outlet.

8. The capsule of claim 7, wherein the resistance is formed by a step in the cavity, and wherein the step is formed by a transition of a front section of the cavity extending along a generally uniform cross-section toward the outlet and a rear section of the cavity extending along a larger generally uniform cross-section toward the capsule body rear end.

9. The capsule of claim 1, wherein the cartridge is received within the cavity and wherein the cartridge is sized and shaped to form a seal with the capsule body.

10. The capsule of claim 1, wherein the capsule further has a nozzle for dispensing the dental material.

11. The capsule of claim 10, wherein the nozzle is movable between a dispensing position and a storage position, wherein in the dispensing position the nozzle is in fluid communication with the outlet and in the storage position the nozzle closes the outlet.

12. The capsule of claim 1, wherein the powder and the liquid are adapted to form in combination a hardenable dental material.

13. The capsule of claim 1, wherein the capsule body comprises a catch for retaining the capsule in a dispensing gun.

14. The capsule of claim 1, wherein the front foil and the rear foil each comprise a metal layer and at least one polymer layer, and each of the front foil and the rear foil being arranged with the polymer layer toward the cartridge.

15. The capsule of claim 1, wherein the at least one stopper is arranged to stop the piston at a position prior to an end position within the cartridge.

16. The capsule of claim 1, wherein the at least one stopper is arranged such that the piston is prevented from contacting a step formed in the channel of the cartridge.

* * * * *